March 4, 1947.  F. J. NOWICKE  2,416,841
ELECTRODE HOLDER
Filed June 19, 1944
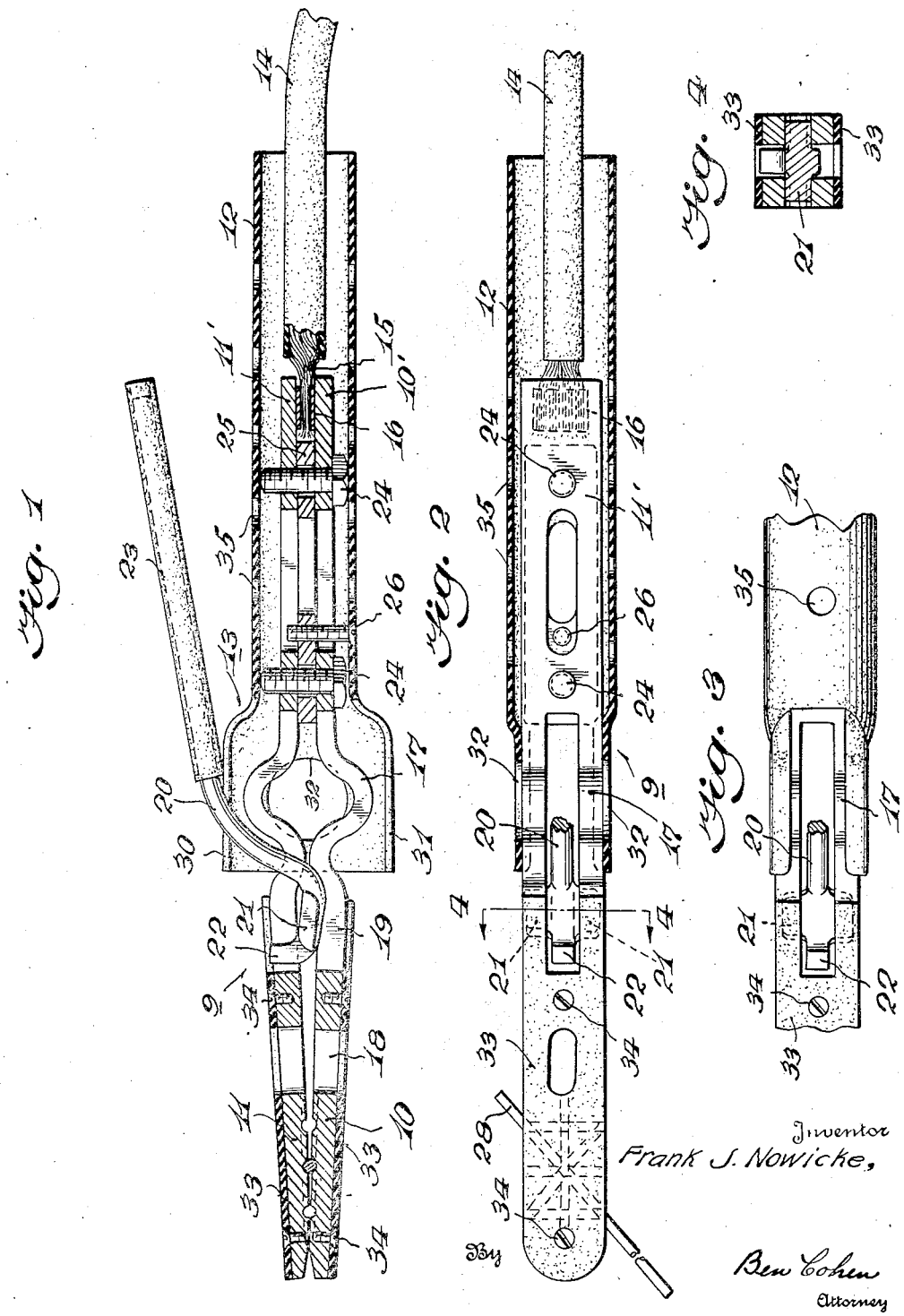
Inventor
Frank J. Nowicke,
By Ben Cohen
Attorney Patented Mar. 4, 1947

2,416,841

UNITED STATES PATENT OFFICE 2,416,841

ELECTRODE HOLDER

Frank J. Nowicke, Hanover, Md.

Application June 19, 1944, Serial No. 541,059

2 Claims. (Cl. 219—8)

This invention relates to an electrode holder for use in arc welding or the like, and more particularly constitutes an improvement on my Patents Nos. 2,305,188 and 2,305,189.

An object of this invention is to provide an improved electrode holder having a tubular insulated handle into which the body of an electrode holder is inserted. The body of the electrode holder has a longitudinally divided shank which has its sections so formed as to receive between them the end of an electrical conductor or cable.

Another object of this invention is the provision of an electrode holder so constructed that the tubular insulated handle is extended forward about the spring hinge of the clamping jaws.

Another object of the invention is the provision of a structure so arranged that a cam may be used between the jaws to separate them for receiving the electrode therebetween.

Other objects of the invention are to provide an electrode holder of simplified construction using relatively few parts, thereby reducing the cost of its manufacture and reducing the amount of metal used in its construction, and resulting in a saving of material and in decreasing the weight of the holder.

These and other detailed objects of the invention will be apparent from the following description taken in connection with the following drawing in which:

Figure 1 is a longitudinal vertical section through the holder illustrating the details of construction.

Fig. 2 is a top plan view of the holder shown in Fig. 1 with the handle in section.

Fig. 3 is a fragmentary elevational view.

Fig. 4 is a sectional view taken on the line 4—4 of Fig. 2.

Referring to the drawing in detail, the electrode holder 9 comprises a pair of jaw members 10 and 11 and a removable insulating handle 12 having its forward end 13 belled as shown. Located within the handle 12 are the rear ends 10′ and 11′ of jaws 10 and 11, which ends are clamped together by bolts 24 and a spacing bar 25 on the end wires 15 of a conduit 14, the end wires 15 being wrapped with a flat piece of copper 16 to keep the end wires 15 together.

The jaws 10 and 11 are identical and a description of one will suffice for both. Jaw member 10 comprises a flat elongated bar having a resilient bowed portion 17 formed substantially midway thereof. The provision of the spring bow 17 increases the resiliency of the jaw member and also increases the length of metal between the forward end of the jaw and the handle portion, thereby tending to reduce the transfer of heat from the electrode end to the handle end.

The forward end of the jaw 10 is provided with gripping recesses extending at desirable angles. Jaw member 10 is further provided with a series of slots 18 and 19. Slot 18 is provided to increase the heat radiating surface and to reduce the weight of the holder.

A jaw opening mechanism is provided embodying a lever 20 having a cam 21 and an upturned toe 22. The jaw opening mechanism extends through the slot 19 so as to locate the cam 21 between the jaws 10 and 11 with the toe 22 extending upwardly through the slot 19 to keep the jaw opening mechanism from rotating. The lever 20 is provided with a removable insulated handle 23 extending rearwardly about the end of lever 20 over the handle 12 of the tool 9 where it may conveniently be manipulated by the operator. It will be apparent that the downward movement of the handle from the position shown in Fig. 1 will rotate the cam 21 between the jaws 10 and 11 and thus cause separation of the jaws against the closing action of the bowed portion 17, and the electrode 27 may then be inserted.

It will be noted that the belled end 13 of the handle 12 is somewhat flattened on the sides and is slotted as at 30 and 31 at the top and bottom. The slot 30 at the top provides a path for the operation of the lever 20. The slot 31 at the bottom and the openings 32 in the sides of the belled end 13 provide additional heat radiation openings, thus minimizing the amount of heat that reaches the handle ends 10′ and 11′ of jaws 10 and 11.

It will also be noted that the bottom of the belled end 13 of handle 12 is flattened and serves to provide a resting means for the tool when it is set down on any flat surface without any danger of providing an arc to the flat surface. It will also be noted that the jaws 10 and 11 are each provided with insulating sheaths 33 secured thereto by screws 34 thereby completely electrically insulating the tool. The handle 12 is provided with a number of ventilation openings 35.

In operation, as already pointed out, the jaws 10 and 11 with their ends 10′ and 11′ are substantially identical, thus simplifying the manufacture thereof. They are assembled together by placing the spacing bar 25 between the ends 10′ and 11′ with the cable end 14 and then secured together by means of the bolts 24. The insulating handle 12 is placed over the cable 14 before the cable end 15 is secured between the jaw ends 10′ and 11′. After the jaw ends have been secured together the insulating handle 12 is then slid forward until the belled end extends about the spring bows 17 of the jaws 10 and 11, the lever 20 and cam 21 having been placed in position before the bolts 24 are tightened. It will be noted, however, that the lever 20, cam 21 and extending toe 22 can be placed in position or removed from position even after the bolts 24 are tightened by merely retracting the lever 20 until it is in the space between the bowed portions 17. The handle end of lever 20 is then raised until it is at about a right angle to the jaws and then by rotating it 90° the cam 21 can be slid out through the longitudinal slot which extends into and across the bowed portions 17. This is an advantage when the lever or any of its parts become defective and it is necessary to replace the same, thus eliminating the necessity for disassembling the whole tool.

The handle 12 is then secured in position by means of a screw 26 and with the insulating sheaths 33 secured to the jaws by the screws 34 the tool is ready to receive the electrode 28 for operation.

Thus it will be seen that I have described a construction well adapted to produce the various objects and advantages pointed out above. While I have shown a preferred embodiment of the invention, it will be understood that the invention is not to be limited to the form shown but may be modified within the scope of the appended claims.

Having thus described the invention, what I claim is:

1. An electrode holder comprising a pair of substantially identical jaw members having electrode receiving jaw ends and cable receiving securing ends connected to the jaw ends by resilient bowed portions, a perforated insulating handle member extending about said cable receiving securing ends and adapted to be secured thereto, said insulating handle having a belled portion extending forwardly about the resilient bowed portions of the jaw members, said belled end being flattened and perforated on its sides and slotted at its top and bottom, a cam member located between said jaw members adjacent said bowed portions, a lever extending through an elongated slot in one of said jar members for operating said cam to separate said jaws to electrode receiving position, said lever extending through one of the slots of the belled end of said insulating handle, an extending toe on said lever beyond said cam extending into the elongated slot of a jaw member to prevent accidental rotation of said lever, a spacing bar separating the cable receiving securing ends of said jaw members, and a metal fastening member extending about the end of the cable and clamped between the ends of the cable receiving ends of said jaw members to provide a good electrical and mechanical connection between said cable and said electrode holder.

2. An electrode holder comprising a pair of substantially identical jaw members having electrode receiving jaw ends and cable receiving securing ends connected to the jaw ends by resilient bowed portions, a perforated insulating handle member extending about said cable receiving securing ends and adapted to be secured thereto, said insulating handle having a belled portion extending forwardly about the resilient bowed portions of the jaw members, said belled end being flattened and perforated on its sides and slotted at its top and bottom, a cam member located between said jaw members adjacent said bowed portions, a lever extending through an elongated slot in one of said jaw members for operating said cam to separate said jaws to electrode receiving position, said lever extending through one of the slots of the belled end of said insulating handle, an extending toe on said lever beyond said cam extending into the elongated slot of a jaw member to prevent accidental rotation of said lever, a spacing bar separating the cable receiving securing ends of said jaw members, and a metal fastening member extending about the end of the cable and clamped between the ends of the cable receiving ends of said jaw members to provide a good electrical and mechanical connection between said cable and said electrode holder, said insulating handle being secured to the holder by a bolt fastened in the spacing bar.

FRANK J. NOWICKE.

REFERENCES CITED

The following references are of record in the file of this patent:

UNITED STATES PATENTS

| Number | Name | Date |
| --- | --- | --- |
| 2,196,565 | Pishioneri | Apr. 9, 1940 |
| 2,251,779 | Bourque (1) | Aug. 5, 1941 |
| 2,283,162 | Bourque (2) | May 19, 1942 |
| 2,305,189 | Nowicke | Dec. 15, 1942 |